United States Patent
Zoitos et al.

(10) Patent No.: US 9,919,954 B2
(45) Date of Patent: *Mar. 20, 2018

(54) INORGANIC FIBER

(71) Applicant: UNIFRAX I LLC, Tonawanda, NY (US)

(72) Inventors: Bruce K. Zoitos, Williamsville, NY (US); Michael J. Andrejcak, Tonawanda, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,988

(22) Filed: Jan. 16, 2017

(65) Prior Publication Data

US 2017/0121861 A1    May 4, 2017

Related U.S. Application Data

(63) Continuation of application No. 14/211,203, filed on Mar. 14, 2014, now Pat. No. 9,567,256.

(60) Provisional application No. 61/792,925, filed on Mar. 15, 2013.

(51) Int. Cl.
| | |
|---|---|
| *C03C 13/00* | (2006.01) |
| *C03C 3/085* | (2006.01) |
| *C03C 13/06* | (2006.01) |
| *D01F 9/08* | (2006.01) |
| *C04B 35/20* | (2006.01) |
| *C04B 35/622* | (2006.01) |
| *C04B 35/653* | (2006.01) |
| *D04H 1/4209* | (2012.01) |
| *C03C 3/087* | (2006.01) |
| *C03C 25/42* | (2006.01) |

(52) U.S. Cl.
CPC .............. *C03C 13/00* (2013.01); *C03C 3/085* (2013.01); *C03C 13/006* (2013.01); *C03C 13/06* (2013.01); *C04B 35/20* (2013.01); *C04B 35/62231* (2013.01); *C04B 35/653* (2013.01); *D01F 9/08* (2013.01); *C03C 3/087* (2013.01); *C03C 25/42* (2013.01); *C03C 2213/02* (2013.01); *C04B 2235/3208* (2013.01); *C04B 2235/3217* (2013.01); *C04B 2235/3241* (2013.01); *C04B 2235/3272* (2013.01); *C04B 2235/3409* (2013.01); *C04B 2235/5264* (2013.01); *C04B 2235/72* (2013.01); *C04B 2235/9615* (2013.01); *D04H 1/4209* (2013.01); *Y10T 428/298* (2015.01); *Y10T 442/623* (2015.04); *Y10T 442/682* (2015.04); *Y10T 442/696* (2015.04)

(58) Field of Classification Search
CPC ......... C03C 3/085; C03C 3/087; C03C 13/00; C03C 13/006; C03C 13/06
See application file for complete search history.

(56) References Cited

U.S. PATENT DOCUMENTS

| | | | |
|---|---|---|---|
| 2,576,312 | A | 11/1951 | Minnick |
| 2,690,393 | A | 9/1954 | McGarvey |
| 2,693,668 | A | 11/1954 | Slayter |
| 2,699,415 | A | 1/1955 | Nachtman |
| 2,710,261 | A | 6/1955 | McMullen |
| 2,876,120 | A | 3/1959 | Machlan |
| 2,877,124 | A | 3/1959 | Welsh |
| 3,112,184 | A | 11/1963 | Hollenbach |
| 3,166,428 | A | 1/1965 | Thomas |
| 3,380,818 | A | 4/1968 | Smith |
| 3,383,275 | A | 5/1968 | Croop et al. |
| 3,455,731 | A | 7/1969 | Nielsen et al. |
| 3,458,329 | A | 7/1969 | Owens et al. |
| 3,469,729 | A | 9/1969 | Grekila et al. |
| 3,597,179 | A | 8/1971 | Simmons |
| 3,687,850 | A | 8/1972 | Gagin |
| 3,783,092 | A | 1/1974 | Majumdar |
| 3,788,885 | A | 1/1974 | Birchall et al. |
| 3,804,608 | A | 4/1974 | Gaskell et al. |
| 3,804,646 | A | 4/1974 | Dumbaugh, Jr. |
| 3,887,386 | A | 6/1975 | Majumdar |
| 3,899,342 | A | 8/1975 | Birchall et al. |

(Continued)

FOREIGN PATENT DOCUMENTS

| | | |
|---|---|---|
| CA | 1 271 785 A | 7/1990 |
| CA | 2017344 | 11/1990 |

(Continued)

OTHER PUBLICATIONS

Wallenburger, et al. "Inviscid melt spinning: As-spun crystalline alumina fibers", J. Mater. Res., vol. 5, No. 11, Nov. 1990.
Shyu, Jiin-Jyh and Wu, Jenn-Ming, Effect of $TiO_2$ addition on the nucleation of apatite in an MgO—CaO—SiO—$P_2O_5$ glass, Journal of Materials Science Letters, vol. 10, 1991.
PCT/US2014/027666, International Search Report, dated Jul. 24, 2014.

(Continued)

*Primary Examiner* — Elizabeth A. Bolden
(74) *Attorney, Agent, or Firm* — Curatolo Sidoti Co., LPA; Salvatore A. Sidoti; Floyd Trillis, III

(57) ABSTRACT

An inorganic fiber containing silica and magnesia as the major fiber components and which further includes an intended iron oxide additive to improve the dimensional stability of the fiber. The inorganic fiber exhibits good thermal insulation performance at 1400° C. and greater, retains mechanical integrity after exposure to the use temperature, and which remains non-durable in physiological fluids. Also provided are thermal insulation product forms comprising a plurality of the inorganic fibers, methods of preparing the inorganic fiber and of thermally insulating articles using thermal insulation prepared from a plurality of the inorganic fibers.

18 Claims, 3 Drawing Sheets

(56) References Cited

U.S. PATENT DOCUMENTS

| | | |
|---|---|---|
| 3,900,329 A | 8/1975 | Grubb et al. |
| 3,985,935 A | 10/1976 | Brodmann |
| 3,992,498 A | 11/1976 | Morton et al. |
| 4,037,015 A | 7/1977 | Koike et al. |
| 4,104,355 A | 8/1978 | Dunn et al. |
| 4,118,239 A | 10/1978 | Gagin et al. |
| 4,194,914 A | 3/1980 | Moriya et al. |
| 4,317,575 A | 3/1982 | Cavicchio et al. |
| 4,345,430 A | 8/1982 | Pallo et al. |
| 4,358,500 A | 11/1982 | George et al. |
| 4,375,493 A | 3/1983 | George et al. |
| 4,382,104 A | 5/1983 | Smith et al. |
| 4,396,661 A | 8/1983 | George et al. |
| 4,428,999 A | 1/1984 | George et al. |
| 4,461,840 A | 7/1984 | Massol |
| 4,507,355 A | 3/1985 | George et al. |
| 4,547,403 A | 10/1985 | Smith |
| 4,563,219 A | 1/1986 | George et al. |
| 4,604,097 A | 8/1986 | Graves |
| 4,613,577 A | 9/1986 | Tagai et al. |
| 4,615,988 A | 10/1986 | Le Molgne et al. |
| 4,659,610 A | 4/1987 | George et al. |
| 4,673,594 A | 6/1987 | Smith |
| 4,735,857 A | 4/1988 | Tagai et al. |
| 4,737,192 A | 4/1988 | Smith |
| 4,820,573 A | 4/1989 | Tagai et al. |
| 4,830,989 A | 5/1989 | Trivedi et al. |
| 4,867,779 A | 9/1989 | Meunier et al. |
| 4,933,307 A | 6/1990 | Marshall et al. |
| 5,037,470 A | 8/1991 | Matzen et al. |
| 5,055,428 A | 10/1991 | Porter |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,384,188 A | 1/1995 | Lebold et al. |
| 5,389,716 A | 2/1995 | Graves |
| 5,420,087 A | 5/1995 | Wieland et al. |
| 5,480,676 A | 1/1996 | Sonuparlak et al. |
| 5,486,232 A | 1/1996 | Griffith et al. |
| 5,552,213 A | 9/1996 | Eschner |
| 5,569,629 A | 10/1996 | Teneyck et al. |
| 5,576,252 A | 11/1996 | Rapp et al. |
| 5,580,532 A | 12/1996 | Robinson et al. |
| 5,583,080 A | 12/1996 | Guldberg et al. |
| 5,585,312 A | 12/1996 | Teneyck et al. |
| 5,591,516 A | 1/1997 | Jaco et al. |
| 5,603,887 A | 2/1997 | Eschner |
| RE35,557 E | 7/1997 | Thelohan et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,858,465 A | 1/1999 | Hunt et al. |
| 5,874,375 A | 2/1999 | Zoitos et al. |
| 5,928,075 A | 7/1999 | Miya et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,025,288 A | 2/2000 | Zoitos et al. |
| 6,030,910 A | 2/2000 | Zoitos et al. |
| 6,036,762 A | 3/2000 | Sambasivan |
| 6,037,288 A | 3/2000 | Robinson et al. |
| 6,043,170 A | 3/2000 | Steinkopf et al. |
| 6,077,798 A | 6/2000 | Rapp |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,309,994 B1 | 10/2001 | Marra et al. |
| 6,313,050 B1 | 11/2001 | De Meringo et al. |
| 6,346,494 B1 | 2/2002 | Jensen et al. |
| 6,358,872 B1 | 3/2002 | Karppinen et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,551,951 B1 | 4/2003 | Fay et al. |
| 6,652,950 B2 | 11/2003 | Barney et al. |
| 6,716,407 B2 | 4/2004 | Davis et al. |
| 6,855,298 B2 | 2/2005 | Teneyck |
| 6,861,381 B1 | 3/2005 | Jubb et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,259,118 B2 | 8/2007 | Jubb et al. |
| 7,468,336 B2 | 12/2008 | Zoitos et al. |
| 7,468,337 B2 | 12/2008 | Zoitos et al. |
| 7,470,641 B2 | 12/2008 | Jubb et al. |
| 7,550,118 B2 | 6/2009 | Merry et al. |
| 7,567,817 B2 | 7/2009 | Liu et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,781,043 B2 | 8/2010 | Nakayama et al. |
| 7,781,372 B2 | 8/2010 | Liu et al. |
| 7,803,729 B2 | 9/2010 | Keller et al. |
| 7,875,566 B2 | 1/2011 | Freeman et al. |
| 7,887,917 B2 | 2/2011 | Zoitos et al. |
| 7,897,255 B2 | 3/2011 | Liu et al. |
| 8,026,190 B2 | 9/2011 | Keller et al. |
| 8,147,952 B2 | 4/2012 | Iwamoto et al. |
| 9,567,256 B2 * | 2/2017 | Zoitos .............. D01F 9/08 |
| 2002/0022567 A1 | 2/2002 | Li et al. |
| 2002/0032116 A1 | 3/2002 | Jubb et al. |
| 2002/0107133 A1 | 8/2002 | Troczynski et al. |
| 2003/0015003 A1 | 1/2003 | Fisler et al. |
| 2003/0049329 A1 | 3/2003 | Lee et al. |
| 2003/0138673 A1 | 7/2003 | Sambasivan et al. |
| 2003/0162019 A1 | 8/2003 | Zoitos et al. |
| 2004/0011245 A1 | 1/2004 | Sambasivan et al. |
| 2005/0032620 A1 | 2/2005 | Zoitos et al. |
| 2005/0079970 A1 | 4/2005 | Otaki et al. |
| 2005/0085369 A1 | 4/2005 | Jensen |
| 2005/0268656 A1 | 12/2005 | Raichel et al. |
| 2006/0094583 A1 | 5/2006 | Freeman et al. |
| 2006/0211562 A1 | 9/2006 | Fisler et al. |
| 2007/0020454 A1 | 1/2007 | Zoitos et al. |
| 2007/0275843 A1* | 11/2007 | Lewis .............. C03C 3/083 501/70 |
| 2008/0191179 A1 | 8/2008 | Bernard et al. |
| 2009/0042030 A1 | 2/2009 | Douce et al. |
| 2009/0130937 A1 | 5/2009 | Wainwright et al. |
| 2010/0055457 A1 | 3/2010 | Jubb et al. |
| 2010/0184581 A1 | 7/2010 | Berthereau et al. |
| 2010/0209306 A1 | 8/2010 | Kunze et al. |
| 2011/0118102 A1 | 5/2011 | Zoitos et al. |
| 2011/0172077 A1 | 7/2011 | Lewis |

FOREIGN PATENT DOCUMENTS

| | | |
|---|---|---|
| CA | 2043699 | 12/1991 |
| DE | 29515081 U1 | 1/1997 |
| DE | 196 38 542 A1 | 3/1997 |
| EP | 0 074 655 A1 | 3/1983 |
| EP | 0132078 | 1/1985 |
| EP | 0 142 715 A2 | 5/1985 |
| EP | 0 146 398 A2 | 6/1985 |
| EP | 0 155 550 A1 | 9/1985 |
| EP | 0 178 688 A2 | 4/1986 |
| EP | 0 178 689 A2 | 4/1986 |
| EP | 0 186 128 A2 | 7/1986 |
| EP | 0 302 465 A2 | 2/1989 |

(56) References Cited

FOREIGN PATENT DOCUMENTS

| | | |
|---|---|---|
| EP | 0 417 493 A2 | 3/1991 |
| EP | 0 427 873 A1 | 5/1991 |
| EP | 0 539 342 A1 | 4/1993 |
| EP | 0 586 797 A1 | 3/1994 |
| EP | 0 834 489 A1 | 4/1998 |
| EP | 1 086 936 A2 | 3/2001 |
| EP | 1 323 687 A2 | 7/2003 |
| EP | 1 908 737 A1 | 4/2008 |
| EP | 1 725 503 B1 | 7/2008 |
| FR | 2662687 | 12/1991 |
| FR | 2 778 401 A1 | 11/1999 |
| GB | 520247 | 4/1940 |
| GB | 1 360 197 | 7/1974 |
| GB | 1 360 198 | 7/1974 |
| GB | 1 360 199 | 7/1974 |
| GB | 1 360 200 | 7/1974 |
| GB | 2 200 129 A | 7/1988 |
| GB | 2 383 793 | 7/2003 |
| GB | 2 383 793 A | 7/2003 |
| JP | S58-46121 A | 3/1983 |
| JP | 2003-089547 A | 3/2003 |
| JP | 2004-036050 A | 2/2004 |
| JP | 2005-089913 A | 4/2006 |
| JP | 06-272116 A | 10/2006 |
| JP | 07-033546 A | 2/2007 |
| JP | 3938671 B2 | 6/2007 |
| JP | 07-303011 A | 11/2007 |
| JP | 4007482 B2 | 11/2007 |
| JP | 49-85337 B2 | 7/2012 |
| KR | 10-0469776 B1 | 9/2005 |
| KR | 10-0676167 B1 | 2/2007 |
| WO | WO 85/02393 A1 | 6/1985 |
| WO | WO 85/02394 A1 | 6/1985 |
| WO | WO 87/05007 A1 | 8/1987 |
| WO | 89/12032 A2 | 12/1989 |
| WO | WO 90/02713 A1 | 3/1990 |
| WO | WO 92/07801 A1 | 5/1992 |
| WO | WO 92/09536 A1 | 6/1992 |
| WO | WO 93/15028 A1 | 8/1993 |
| WO | WO 94/15883 A1 | 7/1994 |
| WO | WO 96/05147 A1 | 2/1996 |
| WO | WO 97/16386 A1 | 5/1997 |
| WO | WO 98/05600 A1 | 2/1998 |
| WO | WO 98/32606 A1 | 7/1998 |
| WO | WO 98/51981 A1 | 11/1998 |
| WO | WO 02/16263 A1 | 2/2002 |
| WO | WO 03/031368 A2 | 4/2003 |
| WO | WO 03/050054 A1 | 6/2003 |
| WO | WO 03/059835 A1 | 7/2003 |
| WO | WO 2006/048610 A1 | 5/2006 |
| WO | WO 2007/005836 A2 | 1/2007 |
| WO | WO 2007/054697 A1 | 5/2007 |
| WO | WO 2007/086677 A1 | 8/2007 |

OTHER PUBLICATIONS

PCT/US2014/027666, International Written Opinion, dated Jul. 24, 2014.

Office Action dated Oct. 23, 2017 for corresponding Japanese Application No. 2016-502510.

* cited by examiner

INORGANIC FIBER

CROSS REFERENCE TO RELATED APPLICATIONS

The present application is a continuation of U.S. Ser. No. 14/211,203, filed on Mar. 14, 2014, which claims the benefit of the filing date under 35 U.S.C. § 119(e) of U.S. Provisional Application for Patent Ser. No. 61/792,925, filed on Mar. 15, 2013, from which applications priority is claimed, and which are incorporated herein by reference.

TECHNICAL FIELD

A high temperature resistant inorganic fiber that is useful as a thermal, electrical, or acoustical insulating material, and which has a use temperature of 1400° C. and greater is provided. The high temperature resistant inorganic fiber is easily manufacturable, exhibits low shrinkage after exposure to the use temperature, retains good mechanical strength after exposure to the use temperature, and is soluble in physiological fluids.

BACKGROUND

The insulation material industry has determined that it is desirable to utilize fibers in thermal, electrical and acoustical insulating applications, which are not durable in physiological fluids, that is, fiber compositions which exhibit a low biopersistence or a high solubility in physiological fluids. While candidate materials have been proposed, the use temperature limit of these materials have not been high enough to accommodate many of the applications to which high temperature resistant fibers are applied.

Many compositions within the synthetic vitreous fiber family of materials have been proposed which are non-durable or decomposable in a physiological medium.

The high temperature resistant fibers should also exhibit minimal linear shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. In general, inorganic fibers that exhibit both high temperature resistance and non-durability in physiological fluids also exhibit a high degree of after service friability. This results in the fiber lacking the strength or mechanical integrity after exposure to the service temperature to be able to provide the necessary structure to accomplish its insulating purpose. Other measures of mechanical integrity of fibers include compression strength and compression recovery.

Thus, it is desirable to produce an improved inorganic fiber composition that is readily manufacturable from a fiberizable melt of desired ingredients, which exhibits low shrinkage during and after exposure to service temperatures of 1400° C. or greater, which exhibits low brittleness after exposure to the expected use temperatures, and which maintains mechanical integrity after exposure to use temperatures of 1400° C. or greater.

According to certain embodiments, provided is a high temperature resistant inorganic fiber which exhibits a linear shrinkage of 10% or less when exposed a use temperature of 1400° C. or greater, and which maintains mechanical integrity after exposure to the use temperature, and which is non-durable in physiological fluids.

According to certain embodiments, the high temperature resistant inorganic fiber exhibits a linear shrinkage of 5% or less when exposed to a use temperature of 1400° C. or greater, and which maintains mechanical integrity after exposure to the use temperature, and which is non-durable in physiological fluids.

According to certain embodiments, the high temperature resistant inorganic fiber exhibits a linear shrinkage of 4% or less when exposed to a use temperature of 1400° C. or greater, maintains mechanical integrity after exposure to the use temperature, and is non-durable in physiological fluids.

The inorganic fiber comprises the fiberization product of about 65 to about 86 weight percent silica, about 14 to about 35 weight percent magnesia, and an intended iron oxide addition, wherein said inorganic fiber exhibits a shrinkage of 10% or less at 1400° C.

Also provided is a method for preparing a high temperature resistant inorganic fiber which exhibits a linear shrinkage of 10% or less when exposed to a use temperature of 1400° C. or greater, which maintains mechanical integrity after exposure to the use temperature, and which is non-durable in physiological fluids.

According to certain embodiments, the method comprises preparing a high temperature resistant inorganic fiber which exhibits a linear shrinkage of 5% or less when exposed to a use temperature of 1400° C. or greater, which maintains mechanical integrity after exposure to the use temperature, and which is non-durable in physiological fluids.

According to certain embodiments, the method comprises preparing a high temperature resistant inorganic fiber which exhibits a linear shrinkage of 4% or less when exposed to a use temperature of 1400° C. or greater, which maintains mechanical integrity after exposure to the use temperature, and which is non-durable in physiological fluids.

According to certain illustrative embodiments, the method for preparing a high temperature resistant inorganic fiber having a use temperature of 1400° C. or greater, which maintains mechanical integrity after exposure to the use temperature, and which is non-durable in physiological fluids comprises forming a melt with ingredients comprising about 65 to about 86 weight percent silica, about 14 to about 35 weight percent magnesia, and an iron oxide containing material; and producing fibers from the melt.

Also provided is a method of insulating an article with fibrous insulation prepared from a plurality of the inorganic fibers. The method includes disposing on, in, near or around the article to be thermally insulated, a thermal insulation material comprising a plurality of the inorganic fibers and exposing the article to be thermally insulation to a temperature of 1400° C. or greater.

According to certain illustrative embodiments, the method of thermally insulating an article comprises disposing on, in, near or around the article, a thermal insulation material comprising a plurality of inorganic fibers comprising the fiberization product of a melt of ingredients comprising from 70 weight percent or greater silica, magnesia, and an intended addition of greater than 0 to 10 weight percent iron oxide, wherein the fiber exhibits a shrinkage of 10% or less at 1400° C.

According to certain illustrative embodiments, the method of thermally insulating an article comprises disposing on, in, near or around the article, a thermal insulation material comprising a plurality of inorganic fibers comprising the fiberization product of a melt of ingredients comprising from 70 weight percent or greater silica, magnesia, and an intended addition of greater than 0 to 10 weight percent iron oxide, wherein the fiber exhibits a shrinkage of 10% or less at 1400° C.

According to certain illustrative embodiments, the method of thermally insulating an article comprises disposing on, in, near or around the article, a thermal insulation material comprising a plurality of inorganic fibers comprising the fiberization product of a melt of ingredients comprising from 70 weight percent or greater silica, magnesia, and greater than 0 to 10 weight percent iron oxide, wherein said inorganic fiber exhibits a shrinkage of 5% or less at 1400° C.

Also provided is an inorganic fiber containing article comprising a plurality of the inorganic fibers as described above, in the form of bulk fiber, blankets, needled blankets, papers, felts, cast shapes, vacuum cast forms, or compositions.

Figure 1:
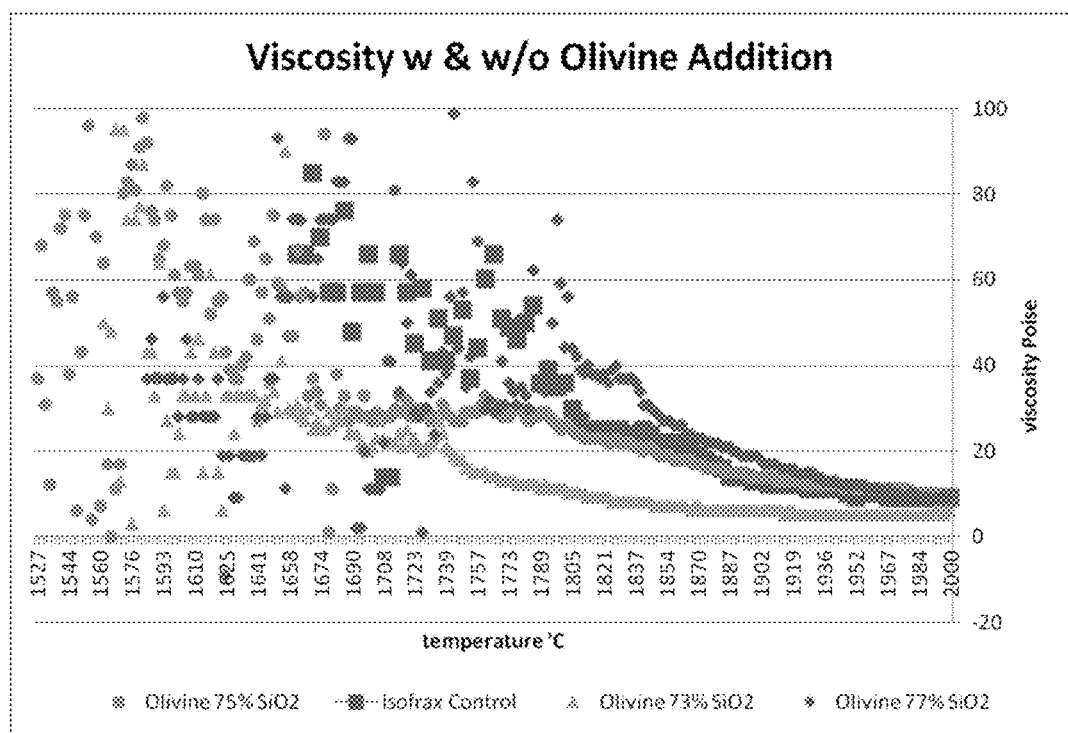
FIG. 1 is a viscosity vs. temperature curve of a melt chemistry for a commercially available magnesium-silicate fiber and magnesium-silicate fiber which includes iron oxide.
Figure 2:
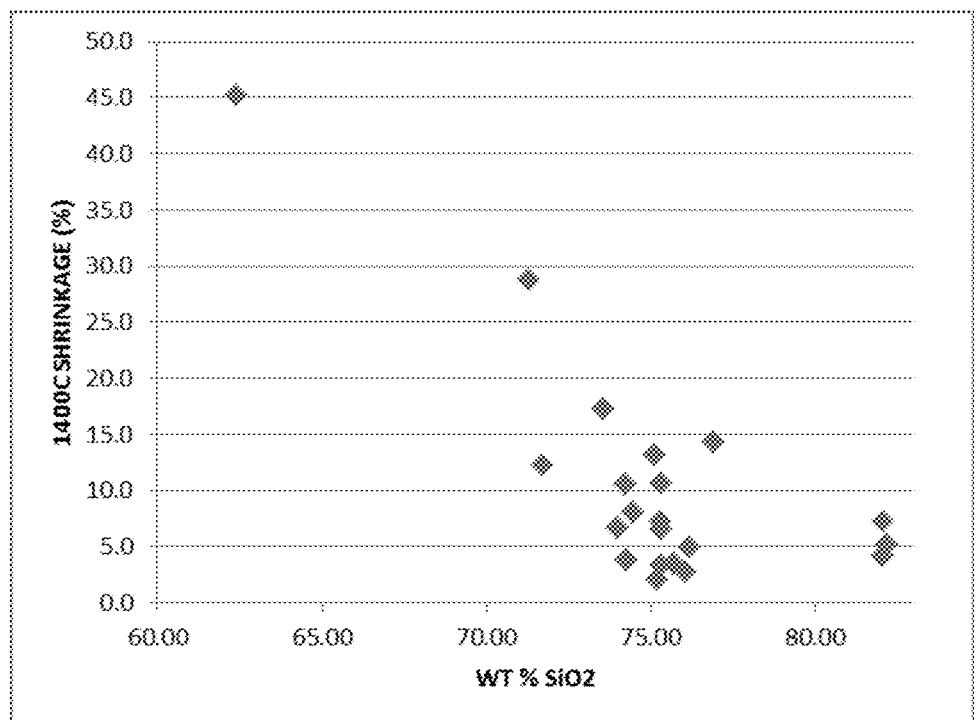
FIG. 2 is a graphical representation of the linear shrinkage of magnesium-silicate fibers containing at least 70 weight percent silica and including an iron oxide addition at 1400° C.
Figure 3:
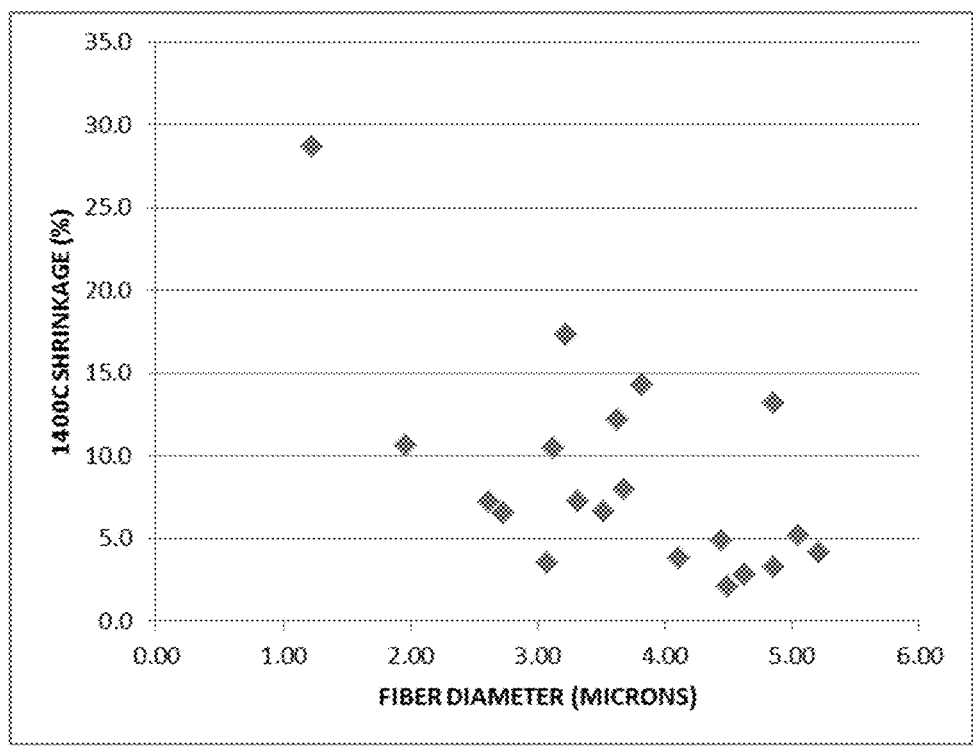
FIG. 3 is a graphical representation of the linear shrinkage of magnesium-silicate fibers containing at least 70 weight percent silica and including an iron oxide addition at 1400° C. as a function of fiber diameter.

An inorganic fiber that is useful as a thermal, electrical, and acoustical insulation material is provided. The inorganic fiber has a continuous service or use temperature of 1260° C. or greater. According to other embodiments, the inorganic fiber has a continuous service or use temperature of 1400° C. or greater while still exhibiting a linear shrinkage of 10% or less at 1400° C. in certain embodiments, 5% or less at 1400° C. in certain embodiments, or 4% or less at 1400° C. in certain embodiments, as determined by the linear shrinkage test method described below.

According to certain illustrative embodiments, the inorganic fiber exhibits a linear shrinkage of 3% or less at 1260° C. and 4% or less at 1400° C.

In order for a glass composition to be a viable candidate for producing a satisfactory high temperature resistant fiber product, the fiber to be produced must be manufacturable from a melt of ingredients, sufficiently soluble in physiological fluids, and capable of surviving high temperatures with minimal shrinkage and minimal loss of mechanical integrity during and after exposure to the high service temperatures.

The present inorganic fiber is non-durable in physiological fluids. By "non-durable" in physiological fluids, it is meant that the inorganic fiber at least partially dissolves in such fluids, such as simulated lung fluid, during in vitro tests.

Durability may be tested by measuring the rate at which mass is lost from the fiber (ng/cm$^2$-hr) under conditions which simulate the temperature and chemical conditions found in the human lung. This test consists of exposing approximately 0.1 g of de-shotted fiber to 50 ml of simulated lung fluid (SLF) for 6 hours. The entire test system is maintained at 37° C. to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. The present fibers are significantly less durable than normal refractory ceramic fiber in simulated lung fluid.

"Viscosity" refers to the ability of a glass melt to resist flow or shear stress. The viscosity-temperature relationship is critical in determining whether it is possible to fiberize a given glass composition. An optimum viscosity curve would have a low viscosity (5-50 poise) at the fiberization temperature and would gradually increase as the temperature decreased. If the melt is not sufficiently viscous (i.e. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. Viscosity modifiers permit fibers to be blown or spun from the fiber melt. It is desirable, however, that such viscosity modifiers, either by type or amount, do not adversely impact the solubility, shrink resistance, or mechanical strength of the blown or spun fiber.

One approach to testing whether a fiber of a defined composition can be readily manufactured at an acceptable quality level is to determine whether the viscosity curve of the experimental chemistry matches that of a known product which can be easily fiberized. Viscosity-temperature profiles may be measured on a viscometer, capable of operating at elevated temperatures. In addition, an adequate viscosity profile may be inferred by routine experimentation, examining the quality of fiber (index, diameter, length) produced. The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of the composition, as will the overall steepness of the viscosity vs. temperature curve.

Linear shrinkage of an inorganic fiber is a good measure of a fiber's dimensional stability at high temperatures or of its performance at a particular continuous service or use temperature. Fibers are tested for shrinkage by forming them into a mat and needle punching the mat together into a blanket of approximately 8 pounds per cubic foot density and a thickness of about 1 inch. Such pads are cut into 3 inch×5 inch pieces and platinum pins are inserted into the face of the material. The separation distance of these pins is then carefully measured and recorded. The pad is then placed into a furnace, ramped to temperature and held at the temperature for a fixed period of time. After heating, the pin separation is again measured to determine the linear shrinkage that pad has experienced.

In one such test, the length and width of the fiber pieces were carefully measured, and the pad was placed in a furnace and brought to a temperature of 1400° C. for 24, 168, or 672 hours. After cooling, the lateral dimensions were measured and the linear shrinkage was determined by comparing "before" and "after" measurements. If the fiber is available in blanket form, measurements may be made directly on the blanket without the need to form a pad.

Mechanical integrity is also an important property since the fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers. The ability of the fiber to maintain its integrity after exposure to the use temperature may also be measured mechanically by testing for compression strength and compression recovery. These tests measure, respectively, how easily the pad may be deformed and the amount of resiliency (or compression recovery) the pad exhibits after a compression of 50%. Visual and tactile observations indicate that the present inorganic fiber remains intact and maintains its form after exposure to a use temperature of at least 1400° C.

The low shrinkage, high temperature resistant inorganic fiber comprises the fiberization product of a melt containing magnesia and silica as the primary constituents. The non-durable inorganic fibers are made by standard glass and ceramic fiber manufacturing methods. Raw materials, such as silica and any suitable source of magnesia such as enstatite, forsterite, magnesia, magnesite, calcined magnesite, magnesium zirconate, periclase, steatite, or talc may be used. If zirconia is included in the fiber melt, any suitable source of zirconia such as baddeleyite, magnesium zirconate, zircon or zirconia may be used, and are introduced into a suitable furnace where they are melted and blown using a fiberization nozzle, or spun, either in a batch or a continuous mode. The iron oxide bearing raw material component for preparing the fiber may be olivine.

The inorganic fiber comprising the fiberization product of magnesia and silica is referred to as a "magnesium-silicate" fiber. The low shrinkage, high temperature resistant inorganic fiber also comprises an intended addition of an iron oxide-bearing raw material component as part of the fiber melt chemistry.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, and greater than 0 to about 4 weight percent alumina.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 65 to about 86 weight percent silica, about 14 to about 35 weight percent magnesia, greater than 0 to about 10 weight percent iron oxide, measured as $Fe_2O_3$, greater than 0 to about 4 weight percent alumina, and 0.3 weight percent or less calcia, and substantially no alkali metal oxide.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, and greater than 0 to about 4 weight percent alumina.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, and 0.3 weight percent or less calcia According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, 1 weight percent or less calcia, and substantially no alkali metal oxide According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 72 to about 86 weight percent silica, about 12.5 to about 26.5 weight percent magnesia, greater than 0 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, and greater than 0 to about 4 weight percent alumina.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 72 to about 80 weight percent silica, about 17 to about 22 weight percent magnesia, greater than 0 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, and greater than 0 to about 3 weight percent alumina.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 3 weight percent alumina, and 1 weight percent or less calcia According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 3 weight percent alumina, and 0.5 weight percent or less calcia.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 3 weight percent alumina, and 0.3 weight percent or less calcia.

According to certain embodiments, the present inorganic fiber comprises the fiberization product of about 72 to about 80 weight percent silica, about 17 to about 22 weight percent magnesia, about 5 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 72 to about 80 weight percent silica, about 17 to about 22 weight percent magnesia, from about 5 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, and greater than 0 to about 4 weight percent alumina.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 70 to about 80 weight percent silica, about 15 to about 25 weight percent magnesia, greater than 0 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, and greater than 0 to about 2 weight percent alumina.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 2 weight percent alumina, and 1 weight percent or less calcia.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 2 weight percent alumina, and 0.5 weight percent or less calcia.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 2 weight percent alumina, and 0.3 weight percent or less calcia.

According to certain embodiments, the present inorganic fiber comprises the fiberization product of about 70 to about 80 weight percent silica, about 15 to about 25 weight percent magnesia, about 5 to about 10 weight percent iron oxide, measured as $Fe_2O_3$, greater than 0 to about 3 weight percent alumina, and substantially no alkali metal oxide.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 70 to about 80 weight percent silica, about 15 to about 25 weight percent magnesia, from about 5 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, and greater than 0 to about 4 weight percent alumina.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 75 to about 79 weight percent silica, about 15 to about 20 weight percent magnesia, greater than 0 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, and greater than 0 to about 2 weight percent alumina.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 2 weight percent alumina, and 1 weight percent or less calcia.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 2 weight percent alumina, and 0.5 weight percent or less calcia According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 2 weight percent alumina, and 0.3 weight percent or less calcia.

According to certain embodiments, the present inorganic fiber comprises the fiberization product of about 75 to about 79 weight percent silica, about 15 to about 20 weight percent magnesia, about 5 to about 10 weight percent iron oxide, measured as $Fe_2O_3$, greater than 0 to about 4 weight percent alumina, and substantially no alkali metal oxide.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 4 weight percent alumina, 1 weight percent or less calcia, and substantially no alkali metal oxide.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 4 weight percent alumina, 0.5 weight percent or less calcia, and substantially no alkali metal oxide.

According to certain embodiments, the present inorganic fiber comprises the fiberization product of about 75 to about 79 weight percent silica, about 15 to about 20 weight percent magnesia, from about 5 to about 10 weight percent iron oxide, measured as $Fe_2O_3$, greater than 0 to about 4 weight percent alumina, 0.3 weight percent or less calcia, and substantially no alkali metal oxide.

According to certain embodiments, the present inorganic fiber comprises the fiberization product of 70 weight percent or greater silica, magnesia, greater than 0 to about 10 weight percent iron oxide, measured as $Fe_2O_3$, and greater than 0 to about 4 weight percent alumina.

According to certain embodiments, the present inorganic fiber comprises the fiberization product of 70 weight percent or greater silica, magnesia, from about 5 to about 10 weight percent iron oxide, measured as $Fe_2O_3$, and greater than 0 to about 4 weight percent alumina.

According to certain embodiments, the present inorganic fiber comprises the fiberization product of 70 weight percent or greater silica, magnesia, from about 1 to about 5 weight percent iron oxide, measured as $Fe_2O_3$, and greater than 0 to about 4 weight percent alumina.

According to certain embodiments, the present inorganic fiber comprises the fiberization product of 70 weight percent or greater silica, magnesia, from about 1 to about 4 weight percent iron oxide, measured as $Fe_2O_3$, and greater than 0 to about 4 weight percent alumina.

According to certain embodiments, the present inorganic fiber comprises the fiberization product of 70 weight percent or greater silica, magnesia, greater than 0 to about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of 70 weight percent or greater silica, magnesia, from about 5 about 10 weight percent iron oxide, measured as $Fe_2O_3$, greater than 0 to about 4 weight percent alumina, and 1 weight percent or less calcia.

According to certain embodiments, the present inorganic fiber comprises the fiberization product of 70 weight percent or greater silica, magnesia, from about 1 about 5 weight percent iron oxide, measured as $Fe_2O_3$, greater than 0 to about 4 weight percent alumina, and 1 weight percent or less calcia.

According to certain embodiments, the present inorganic fiber comprises the fiberization product of 70 weight percent or greater silica, magnesia, from about 1 about 4 weight percent iron oxide, measured as $Fe_2O_3$, greater than 0 to about 4 weight percent alumina, and 1 weight percent or less calcia.

According to certain embodiments, the present inorganic fiber comprises the fiberization product of 70 weight percent or greater silica, magnesia, about 5 to about 10 weight percent iron oxide, measured as $Fe_2O_3$, greater than 0 to about 4 weight percent alumina, and 0.5 weight percent or less calcia.

According to certain embodiments, the present inorganic fiber comprises the fiberization product of 70 weight percent or greater silica, magnesia, from about 1 about 5 weight percent iron oxide, measured as $Fe_2O_3$, greater than 0 to about 4 weight percent alumina, and 0.5 weight percent or less calcia.

According to certain embodiments, the present inorganic fiber comprises the fiberization product of 70 weight percent or greater silica, magnesia, from about 1 about 4 weight percent iron oxide, measured as $Fe_2O_3$, greater than 0 to about 4 weight percent alumina, and 0.5 weight percent or less calcia.

According to certain embodiments, the present inorganic fiber comprises the fiberization product of 70 weight percent or greater silica, magnesia, greater than 0 to about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of 70 weight percent or greater silica, magnesia, from about 5 about 10 weight percent iron oxide, measured as $Fe_2O_3$, greater than 0 to about 4 weight percent alumina, and 0.3 weight percent or less calcia.

According to certain embodiments, the present inorganic fiber comprises the fiberization product of 70 weight percent or greater silica, magnesia, from about 1 about 5 weight percent iron oxide, measured as Fe$_2$O$_3$, greater than 0 to about 4 weight percent alumina, and 0.3 weight percent or less calcia.

According to certain embodiments, the present inorganic fiber comprises the fiberization product of 70 weight percent or greater silica, magnesia, from about 1 about 4 weight percent iron oxide, measured as Fe$_2$O$_3$, greater than 0 to about 4 weight percent alumina, and 0.3 weight percent or less calcia.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and substantially no alkali metal oxide.

According to certain embodiments, the present inorganic fiber comprises the fiberization product of 70 weight percent or greater silica, magnesia, about 5 to about 10 weight percent iron oxide, measured as Fe$_2$O$_3$, greater than 0 to about 4 weight percent alumina, and substantially no alkali metal oxide.

According to certain embodiments, the present inorganic fiber comprises the fiberization product of 70 weight percent or greater silica, magnesia, about 1 to about 5 weight percent iron oxide, measured as Fe$_2$O$_3$, greater than 0 to about 4 weight percent alumina, and substantially no alkali metal oxide.

According to certain embodiments, the present inorganic fiber comprises the fiberization product of 70 weight percent or greater silica, magnesia, about 1 to about 4 weight percent iron oxide, measured as Fe$_2$O$_3$, greater than 0 to about 4 weight percent alumina, and substantially no alkali metal oxide.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, 1 weight percent or less calcia, and substantially no alkali metal oxide.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, 0.5 weight percent or less calcia, and substantially no alkali metal oxide.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, 0.3 weight percent or less calcia, and substantially no alkali metal oxide.

According to certain embodiments, the present inorganic fiber comprises the fiberization product of 70 weight percent or greater silica, magnesia, greater than 0 to about 10 weight percent iron oxide, measured as Fe$_2$O$_3$, greater than and 0 to about 4 weight percent alumina, wherein the fibers have an average diameter of greater than 4 microns and exhibits a shrinkage of 5% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 1 weight percent or less calcia, wherein the fibers have an average diameter of greater than 4 microns and exhibits a shrinkage of 5% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 0.5 weight percent or less calcia, wherein the fibers have an average diameter of greater than 4 microns and exhibits a shrinkage of 5% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 0.3 weight percent or less calcia, wherein the fibers have an average diameter of greater than 4 microns and exhibits a shrinkage of 5% or less.

According to certain embodiments, the present inorganic fiber comprises the fiberization product of 70 weight percent or greater silica, magnesia, greater than 0 to about 10 weight percent iron oxide, measured as Fe$_2$O$_3$, and greater than 0 to about 4 weight percent alumina, wherein the fibers have an average diameter of greater than 4 microns and exhibits a shrinkage of 4% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 1 weight percent or less calcia, wherein the fibers have an average diameter of greater than 4 microns and exhibits a shrinkage of 4% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 0.5 weight percent or less calcia, wherein the fibers have an average diameter of greater than 4 microns and exhibits a shrinkage of 4% or less.

According to certain embodiments, the present inorganic fiber comprises the fiberization product of 70 weight percent or greater silica, magnesia, greater than 0 to about 10 weight percent iron oxide, measured as Fe$_2$O$_3$, greater than 0 to about 4 weight percent alumina, and 0.3 weight percent or less calcia, wherein the fibers have an average diameter of greater than 4 microns and exhibits a shrinkage of 4% or less.

According to certain embodiments, the present inorganic fiber comprises the fiberization product of 70 weight percent or greater silica, magnesia, from about 5 about 10 weight percent iron oxide, measured as Fe$_2$O$_3$, and greater than 0 to about 4 weight percent alumina, wherein the fibers have an average diameter of greater than 4 microns and exhibits a shrinkage of 5% or less.

According to certain embodiments, the present inorganic fiber comprises the fiberization product of 70 weight percent or greater silica, magnesia, from about 1 about 5 weight percent iron oxide, measured as Fe$_2$O$_3$, and greater than 0 to about 4 weight percent alumina, wherein the fibers have an average diameter of greater than 4 microns and exhibits a shrinkage of 5% or less.

According to certain embodiments, the present inorganic fiber comprises the fiberization product of 70 weight percent or greater silica, magnesia, from about 1 about 4 weight percent iron oxide, measured as Fe$_2$O$_3$, and greater than 0 to about 4 weight percent alumina, wherein the fibers have an average diameter of greater than 4 microns and exhibits a shrinkage of 5% or less.

According to certain embodiments, the present inorganic fiber comprises the fiberization product of 70 weight percent or greater silica, magnesia, from about 5 about 10 weight percent iron oxide, measured as $Fe_2O_3$, and greater than 0 to about 4 weight percent alumina, wherein the fibers have an average diameter of greater than 4 microns and exhibits a shrinkage of 4% or less.

According to certain embodiments, the present inorganic fiber comprises the fiberization product of 70 weight percent or greater silica, magnesia, from about 1 about 5 weight percent iron oxide, measured as $Fe_2O_3$, and greater than 0 to about 4 weight percent alumina, wherein the fibers have an average diameter of greater than 4 microns and exhibits a shrinkage of 4% or less.

According to certain embodiments, the present inorganic fiber comprises the fiberization product of 70 weight percent or greater silica, magnesia, from about 1 about 4 weight percent iron oxide, measured as $Fe_2O_3$, and greater than 0 to about 4 weight percent alumina, wherein the fibers have an average diameter of greater than 4 microns and exhibits a shrinkage of 4% or less.

In connection with all of the described embodiments of the inorganic fiber, in addition to magnesia, silica and iron oxide, the magnesium-silicate fiber containing an iron oxide addition may contain calcia impurity. In certain embodiments, the fiber does not contain more than about 1 weight percent calcia impurity. In other embodiments, the fiber contains less than 0.5 weight percent calcia impurity. In other embodiments, the fiber contains less than 0.3 weight percent calcia.

In connection with all of the described embodiments of the inorganic fiber, the magnesium-silicate fibers containing an intended iron oxide addition exhibit a linear shrinkage after exposure to a service temperature of 1400° C. for 24 hours of 10 percent or less. In certain embodiments, the magnesium-silicate fibers containing an intended iron oxide addition exhibits a linear shrinkage after exposure to a service temperature of 1400° C. for 24 hours of 5 percent or less. In certain embodiments, the magnesium-silicate fibers containing an intended iron oxide addition exhibit a linear shrinkage after exposure to a service temperature of 1400° C. for 24 hours of 4 percent or less. In certain embodiments, the magnesium-silicate fibers containing an intended iron oxide addition exhibit a linear shrinkage after exposure to a service temperature of 1400° C. for 24 hours of 4 percent or less and a linear shrinkage after exposure to a service temperature of 1260° C. for 24 hours of 3 percent or less.

The magnesium-silicate fibers containing an intended iron oxide addition are useful for thermal insulating applications at continuous service or operating temperatures of at least 1400° C. or greater. According to certain embodiments, the magnesium-silicate fibers containing iron oxide are useful for thermal insulating applications at continuous service or operating temperatures of at least 1400° C. and it has been found that the magnesium-silicate fibers containing the iron oxide addition do not melt until they are exposed to a temperature of 1500° C. or greater.

The inorganic fibers may be prepared by fiber blowing or fiber spinning techniques. A suitable fiber blowing technique includes the steps of mixing the starting raw materials containing magnesia, silica, and iron oxide bearing compound together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials containing magnesia, silica, and iron oxide bearing compound together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

In some embodiments, the fiber is produced from a melt of raw materials by subjecting the molten stream to a jet of high pressure/high velocity air or by pouring the melt onto rapidly spinning wheels and spinning fiber centrifugally. If the iron oxide bearing compound is provided as an additive to the melt, then a suitable source of the iron oxide raw material is simply added at the proper amount to the raw materials being melted.

The addition of an iron oxide bearing compound as a component of the raw materials which are fiberized, or as a coating which is applied to the exterior surfaces of the fiber, results in a decrease of linear shrinkage of the resulting fiber after exposure to the use temperature. In addition to improvements in shrinkage, the addition of an iron oxide bearing compound as a component of the raw materials which are fiberized decreases the temperature of solidification and results in an improved viscosity of the fiberization melt.

In addition to the iron oxide bearing containing compound, the viscosity of the material melt of ingredients may optionally be controlled by the presence of other viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

A compound containing a lanthanide series element may be utilized to enhance the viscosity of a fiber melt containing silica and magnesia as major components, thereby enhancing the fiberizability of the fiber melt. Other compounds which may be utilized to enhance the viscosity of the fiber melt include alkali metal oxides, and boria. Other elements or compounds may be utilized as viscosity modifiers which, when added to the melt, affect the melt viscosity so as to approximate the profile, or shape, of the viscosity/temperature curve of a melt that is readily fiberizable.

While it is not necessary that the entire exterior surface area of the individual fibers be coated with an iron oxide bearing compound, a sufficient portion of the surface area may be coated with the such compound coating to provide a magnesium-silicate fiber having a continuous use or service temperature of at least 1400° C. Thus, according certain embodiments, a portion of the exterior surfaces of the fiber is coated with an iron oxide bearing compound. According to other embodiments, substantially all of the exterior surface of the fiber is coated with an iron oxide bearing compound. According to yet further embodiments, the entire exterior surface of the fiber is coated with the iron oxide bearing compound.

The coating containing the iron oxide bearing compound may be applied to the exterior surfaces of the fiber either during the fiberization process (at the point of fiberization), or after the magnesium-silicate fibers have been fiberized. It is useful to apply the coating of the compound on the fibers surfaces during the fiberization process. According to this technique, the coating containing the compound is sprayed onto the surfaces of the fibers at the point of fiberization with a suitable spray apparatus having a nozzle for discharging the coating composition onto the fibers. That is, the coating composition containing the compound is applied to the fibers as the fibers are discharged from the molten mixture of ingredients.

The coating containing the iron oxide bearing compound may also be applied to the fiber surfaces after completion of the fiberization process by a number of techniques including, without limitation, dipping, immersing, impregnating, soaking, spraying, or splashing the fibers with the coating composition containing an iron oxide bearing compound.

A method for preparing a low shrinkage, high temperature resistant, non-durable magnesium-silicate fiber containing an intended iron oxide addition and having a use temperature of at least 1400° C. or greater is provided. The method of forming the magnesium-silicate fiber includes forming a material melt of ingredients comprising magnesia, silica, and an iron oxide bearing compound and forming fibers from the melt of ingredients.

In other embodiments, the method of forming the magnesium-silicate fiber includes forming a material melt of ingredients comprising magnesia and silica, forming fibers from the melt of ingredients and coating the resulting fiber at the point of fiberization or after fiberization with an iron oxide bearing compound.

In other embodiments, the method of forming the magnesium-silicate fiber includes forming a material melt of ingredients comprising magnesia, silica, and an iron oxide containing compound, forming fibers from the melt of ingredients and coating the resulting fiber at the point of fiberization or after fiberization with an iron oxide bearing containing compound.

The fiber may be manufactured with existing fiberization technology and formed into multiple thermal insulation product forms, including but not limited to bulk fibers, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc. . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt.

A method of insulating an article using a thermal insulation containing the disclosed magnesium-silicate fibers is also provided. The method of insulating an article includes disposing on, in, near, or around the article to be insulated, a thermal insulation material that contains the magnesium-silicate fibers containing an intended iron oxide addition.

The high temperature resistant inorganic fibers are readily manufacturable from a melt having a viscosity suitable for blowing or spinning fiber, are non-durable in physiological fluids, exhibit good mechanical strength up to the service temperature, exhibit excellent linear shrinkage up to 1400° C., and improved viscosity for fiberization.

EXAMPLES

The following examples are set forth to describe illustrative embodiments of the magnesium-silicate fibers containing an iron oxide addition in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to a use temperature of 1260° C. and 1400° C. for 24 hours. According to certain illustrative embodiments, the test pads manufactured from the inorganic fibers exhibit a compression recovery of at least 10 percent.

Fiber Dissolution

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests.

The durability test measures the rate at which mass is lost from the fiber ($ng/cm^2$-hr) under conditions which simulate the temperature and chemical conditions found in the human lung. In particular, the fibers discussed here are highly soluble in Simulated Lung Fluid at a pH of 7.4.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 $ng/cm^2$-hr are considered indicative of a non-biopersistent fiber.

TABLE I

| Sample | SiO₂ | MgO | Al₂O₃ | CaO | Fe₂O₃ | Cr₂O₃ | NiO |
|---|---|---|---|---|---|---|---|
| C1* | | | | | | | |
| C2** | | | | | | | |
| 3 | 75.19 | 19.7 | 1.17 | 0.14 | 3.75 | 0 | 0 |
| 4 | 76.07 | 19.3 | 1.18 | 0.05 | 3.12 | 0.13 | 0.15 |
| 5 | 75.3 | 20.2 | 1.2 | 0.1 | 3 | 0.1 | 0.2 |
| 6 | 75.7 | 20.63 | 0.29 | 0.05 | 3.03 | 0.14 | 0.16 |
| 7 | 74.25 | 20.9 | 1.26 | 0.06 | 3.16 | 0.2 | 0.17 |
| 8 | 82.07 | 14.15 | 1.32 | 0.04 | 2.19 | 0.12 | 0.11 |
| 9 | 76.16 | 19.37 | 1.32 | 0.04 | 2.83 | 0.13 | 0.15 |
| 10 | 82.2 | 13.99 | 1.38 | 0.06 | 2.12 | 0.11 | 0.12 |
| 11 | 75.31 | 19.46 | 2.11 | 0.04 | 2.78 | 0.17 | 0.14 |
| 12 | 74 | 22.5 | 1.32 | 0.03 | 3.17 | 0.13 | 0.17 |
| 13 | 75.3 | 20.2 | 1.2 | 0.1 | 3 | 0.1 | 0.2 |
| 14 | 82.07 | 14.15 | 1.32 | 0.04 | 2.19 | 0.12 | 0.11 |
| 15 | 74.46 | 19.99 | 1.87 | 0.05 | 3.57 | 0.15 | 0.16 |
| 16 | 74.24 | 19.86 | 2.28 | 0.06 | 3.5 | 0.16 | 0.19 |
| 17 | 75.3 | 20.2 | 1.2 | 0.1 | 3 | 0.1 | 0.2 |
| 18 | 71.71 | 23.21 | 1.06 | 0.03 | 3.61 | 0.19 | 0.18 |
| 19 | 75.14 | 18.29 | 3.53 | 0.04 | 2.71 | 0.14 | 0.14 |
| 20 | 76.93 | 19.75 | 1.33 | 0.19 | 1.64 | 0.07 | 0.09 |
| 21 | 73.57 | 19.82 | 2.98 | 0.05 | 3.52 | 0.15 | 0.17 |
| 22 | 71.3 | 23.7 | 1.1 | 0.18 | 3.34 | 0.17 | 0.18 |
| 23 | 62.4 | 31.6 | 0.8 | 0.13 | 4.56 | 0.21 | 0.24 |

*Blanket commercially available from Unifrax I LLC (Niagara Falls, NY, USA) under the designation DURABLANKET 2600; includes 15-17 weight percent ZrO₂.
**Blanket commercially available from Unifrax I LLC (Niagara Falls, NY, USA) under the designation ISOFRAX Blanket.
C = comparative

TABLE II

| Sample | Fiber Diameter Mean μm | 24 Hour Shrinkage 1260° C. % | 24 Hour Shrinkage 1400° C. % | Compress Recovery 1260° C. % | Compress Recovery 1400° C. % | Compress Strength 1260° C. psi | Compress Strength 1400° C. psi | K (Dissolution) 6-hr |
|---|---|---|---|---|---|---|---|---|
| C1* | | 4.5 | 11.5 | 48 | 34 | 11.9 | 15.6 | 0 |
| C2** | | 6.2 | 8.7 | 32.8 | 7.2 | 6.4 | 2.9 | 375 |
| 3 | 4.5 | 1.9 | 2.1 | 31 | — | 1.9 | — | — |
| 4 | 4.63 | 2.5 | 2.8 | 53.5 | 0 | 2.8 | — | — |
| 5 | 4.86 | 1.2 | 3.3 | 25.6 | 3.6 | 2.1 | 0.3 | 426 |
| 6 | 3.07 | 1.8 | 3.5 | 9.1 | 0 | 1.4 | 0 | 649 |
| 7 | 4.11 | 1.9 | 3.8 | 34.4 | 2.6 | 3 | 0.9 | 332 |
| 8 | 5.21 | 3.9 | 4.1 | — | — | — | — | — |
| 9 | 4.44 | 3 | 4.9 | 33.5 | 2.4 | 3.4 | 1 | — |
| 10 | 5.05 | 4.2 | 5.2 | 67.9 | 14.1 | 5 | 2.3 | 240 |
| 11 | 2.73 | 3.6 | 6.5 | 28.5 | 2.5 | 6.2 | 4.4 | 83 |
| 12 | 3.52 | 2.7 | 6.6 | 39.4 | — | 2.3 | — | — |
| 13 | 3.31 | 2.4 | 7.2 | 24.3 | 5.5 | 3.3 | 1.3 | 426 |
| 14 | 2.62 | 7.8 | 7.2 | — | — | — | — | — |
| 15 | 3.68 | 2.3 | 8 | 29.8 | 1.8 | 3.3 | 1.1 | — |
| 16 | 3.12 | 2.4 | 10.5 | 27 | 1— | 3.9 | 1.2 | — |
| 17 | 1.96 | 3.7 | 10.6 | 11.9 | 4.8 | 2.6 | 1.5 | 426 |
| 18 | 3.63 | 1.7 | 12.2 | — | — | — | — | — |
| 19 | 4.86 | 8 | 13.2 | 39 | 3.3 | 9.4 | 2.1 | 83 |
| 20 | 3.82 | 10.7 | 14.3 | 44.9 | 13.2 | 9.6 | 3.8 | 426 |
| 21 | 3.22 | 4.1 | 17.3 | 27.5 | 1 | 4.4 | 2.1 | — |
| 22 | 1.23 | 12.5 | 28.7 | 10.1 | 0 | 14 | 0 | 363 |
| 23 | 1.2 | 28.3 | 45.2 | — | — | — | — | 622 |

As is shown in Table II above, magnesium-silicate fiber samples which included an iron oxide addition, measured as Fe₂O₃, generally exhibited excellent linear shrinkage values. Compression recovery and dissolution rate remained satisfactory. The results for fiber composition examples containing high levels of alumina exhibit excellent linear shrinkage and dissolution in physiological fluid. This is quite surprising given the fact that it is known in the thermal insulating fiber art that the inclusion of higher levels of alumina in an alkaline earth silicate fiber results in high linear shrinkage and lower solubility as compared to fibers having lower levels of alumina.

While the inorganic fiber, thermal insulation, methods of preparing the inorganic fiber, and method of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and method of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising a fiberization product of greater than 75 weight percent silica, about 15 to less than 25 weight percent magnesia, and 1 to about 10 weight percent iron oxide, measured as Fe₂O₃, wherein said inorganic fiber exhibits a shrinkage of 10% or less at 1400° C. for 24 hours.

2. An inorganic fiber comprising a fiberization product of about 70 to about 80 weight percent silica, about 15 to less than 25 weight percent magnesia, and greater than 5 to about 10 weight percent iron oxide, measured as $Fe_2O_3$, wherein said inorganic fiber exhibits a shrinkage of 10% or less at 1400° C. for 24 hours.

3. The inorganic fiber of claim 2, wherein said inorganic fiber comprises the fiberization product of about 70 to about 80 weight percent silica, about 15 to about 25 weight percent magnesia, greater than 5 to about 10 weight percent iron oxide, measured as $Fe_2O_3$, and 1 weight percent or less calcia.

4. The inorganic fiber of claim 2, wherein said inorganic fiber comprises the fiberization product of about 70 to about 80 weight percent silica, about 15 to about 25 weight percent magnesia, greater than 5 to about 10 weight percent iron oxide, measured as $Fe_2O_3$, and substantially no alkali metal oxide.

5. The inorganic fiber of claim 2, wherein said inorganic fiber comprises the fiberization product of about 70 to about 80 weight percent silica, about 14 to about 25 weight percent magnesia, greater than 5 to about 10 weight percent iron oxide, measured as $Fe_2O_3$, greater than 0 to about 3 weight percent alumina, 1 weight percent or less calcia, and substantially no alkali metal oxide.

6. The inorganic fiber of claim 2, wherein said inorganic fiber comprises the fiberization product of about 72 to about 78 weight percent silica, about 17 to about 22 weight percent magnesia, and greater than 5 to about 10 weight percent iron oxide, measured as $Fe_2O_3$.

7. The inorganic fiber of claim 6, wherein said inorganic fiber comprises the fiberization product of about 72 to about 78 weight percent silica, about 17 to about 27 weight percent magnesia, greater than 5 to about 10 weight percent iron oxide, measured as $Fe_2O_3$, and 1 weight percent or less calcia.

8. The inorganic fiber of claim 6, wherein said inorganic fiber comprises the fiberization product of about 72 to about 78 weight percent silica, about 17 to about 27 weight percent magnesia, greater than 5 to about 10 weight percent iron oxide, measured as $Fe_2O_3$, and substantially no alkali metal oxide.

9. The inorganic fiber of claim 6, wherein said inorganic fiber comprises the fiberization product of about 72 to about 78 weight percent silica, about 17 to about 27 weight percent magnesia, greater than 5 to about 10 weight percent iron oxide, measured as $Fe_2O_3$, greater than 0 to about 3 weight percent alumina, 1 weight percent or less calcia, and substantially no alkali metal oxide.

10. The inorganic fiber of claim 2, wherein said inorganic fiber comprises the fiberization product of about 75 to about 79 weight percent silica, about 15 to about 20 weight percent magnesia, and greater than 5 to about 10 weight percent iron oxide, measured as $Fe_2O_3$.

11. The inorganic fiber of claim 10, wherein said inorganic fiber comprises the fiberization product of about 75 to about 79 weight percent silica, about 15 to about 20 weight percent magnesia, greater than 5 to about 10 weight percent iron oxide, measured as $Fe_2O_3$, and 1 weight percent or less calcia.

12. The inorganic fiber of claim 10, wherein said inorganic fiber comprises the fiberization product of about 75 to about 79 weight percent silica, about 15 to about 20 weight percent magnesia, greater than 5 to about 10 weight percent iron oxide, measured as $Fe_2O_3$, and substantially no alkali metal oxide.

13. The inorganic fiber of claim 10, wherein said inorganic fiber comprises the fiberization product of about 75 to about 79 weight percent silica, about 15 to about 20 weight percent magnesia, greater than 5 to about 10 weight percent iron oxide, measured as $Fe_2O_3$, greater than 0 to about 3 weight percent alumina, 1 weight percent or less calcia, and substantially no alkali metal oxide.

14. The inorganic fiber of claim 2, wherein said inorganic fiber has an average diameter of greater than 4 microns.

15. The inorganic fiber of claim 14, wherein said inorganic fiber exhibits a shrinkage of 5% or less at 1400° C. for 24 hours.

16. The inorganic fiber of claim 15, wherein said inorganic fiber exhibits a shrinkage of 4% or less at 1400° C. for 24 hours.

17. A method of insulating an article at 1400° C. or greater, including disposing on, in, near or around the article, a thermal insulation material, said insulation material comprising a plurality of fibers comprising the fiberization product of claim 2.

18. An inorganic fiber containing article comprising at least one of bulk fiber, blankets, needled blankets, boards, mats, blocks, modules, coatings, cements, moldable compositions, pumpable compositions, putties, ropes, braids, wicking, textiles, papers, felts, cast shapes, vacuum cast forms, or compositions, said fiber containing article comprising a plurality of fibers comprising the fiberization product of claim 2.

* * * * *